United States Patent [19]

Streiff et al.

[11] 4,337,922
[45] Jul. 6, 1982

[54] APPARATUS FOR LAYING AND SECURING HEAVY ELECTRICAL CABLES

[75] Inventors: Mathias Streiff, Schwanden; Peter Schnyder, Netstal, both of Switzerland

[73] Assignee: Mathias Streiff AG, Schwanden, Switzerland

[21] Appl. No.: 133,866

[22] Filed: Mar. 25, 1980

[30] Foreign Application Priority Data

Mar. 27, 1979 [CH] Switzerland ......................... 2821/79

[51] Int. Cl.³ .......................................... B65H 59/00
[52] U.S. Cl. .......................................... 254/134.3 FT
[58] Field of Search ............... 254/134.1 R, 134.3 FT, 254/134.5; 174/99 R, 41

[56] References Cited

FOREIGN PATENT DOCUMENTS 1026388  3/1958  Fed. Rep. of Germany ........ 174/99

Primary Examiner—Robert C. Watson
Attorney, Agent, or Firm—William R. Hinds

[57] ABSTRACT

For pulling a heavy cable into a cable duct, cable holders of which the configuration is adapted to the cross-section of the cable duct are secured to the cables at regular spacings. The cable is pulled into the cable duct by means of a draw wire which is secured to the cable holders and/or to the cable. The draw wire is then anchored at both ends under a tensile stress. In this way, the cable itself is no longer subjected to a tensile stress when it is being pulled into place, and the cable is held at a spacing from the inside wall of the cable duct by means of the cable holders.

6 Claims, 10 Drawing Figures

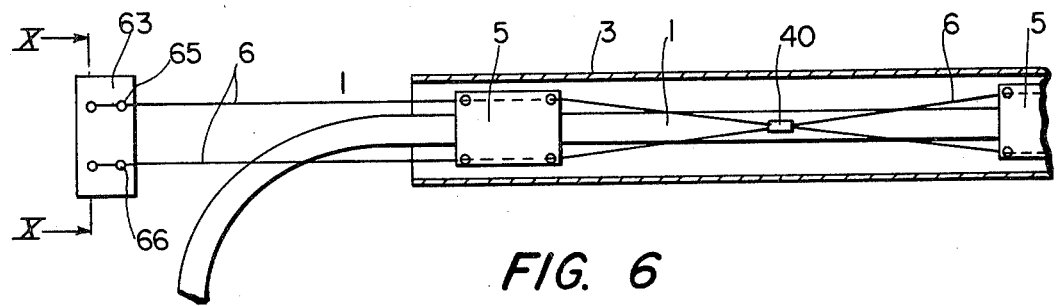
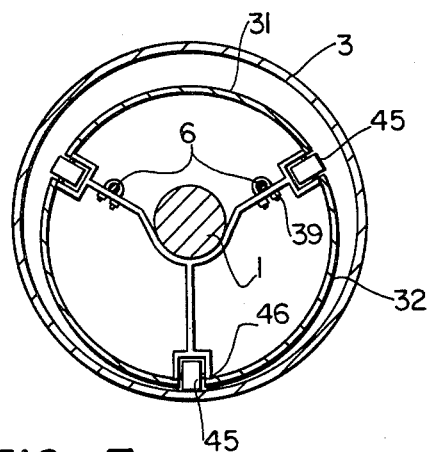
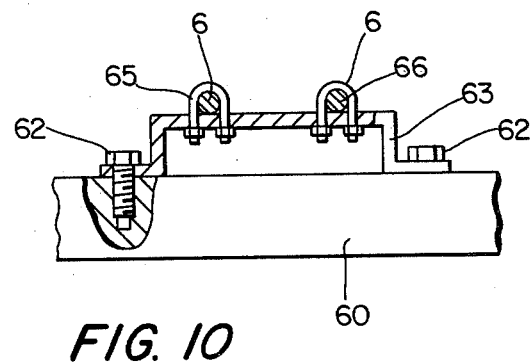
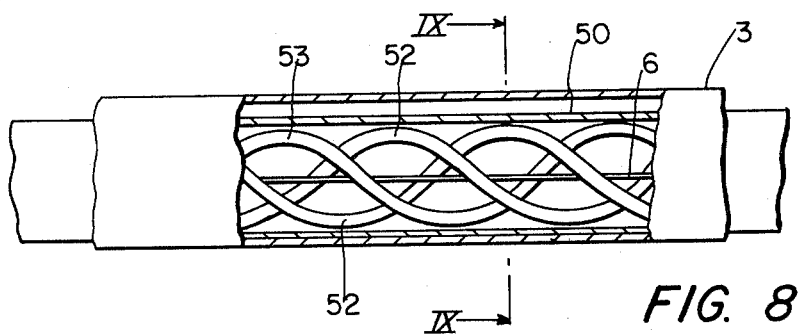
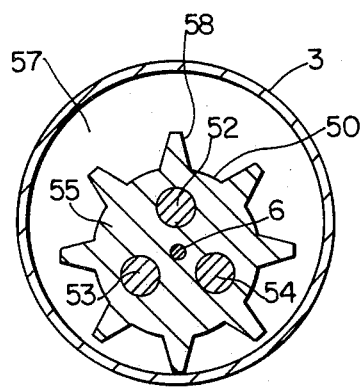

APPARATUS FOR LAYING AND SECURING HEAVY ELECTRICAL CABLES

FIELD OF THE INVENTION

The invention relates to a laying and securing heavy electrical cables in cable ducts.

BACKGROUND OF THE INVENTION

Many methods and apparatuses for such purpose are known and conventional.

Austrian Pat. No. 342,697 for example discloses a cable saddle for securing heavy cables in cable shafts or chutes, having a shell portion to which the cable is secured, and a number of support rollers, projecting beyond the shell portion and removably secured thereto, for pulling the cable into place.

In practice however, it has been found that the known art suffers from a number of disadvantages. Thus, heavy cables can be laid and secured only in cable shafts or chutes, so that, besides the high level of costs for the cables themselves, equally high costs are also incurred for erecting the cable shaft.

It is also known and conventional for cables to be laid directly in the ground to avoid the high costs of building cable shafts or chutes. This manner of laying cables suffers from a number of disadvantages, in regard to heavy cables. On the one hand, heavy cables must be laid in such a way that they can accommodate changes in length which occur as a result of changes in temperature, without high axial tensile or compression stresses being applied to the cable and damaging it. This is not possible when heavy cables are laid in the ground, as the cables do not have any freedom of movement if they are surrounded over their entire circumference with earth, shingle, sand or the like. On the other hand, it is necessary for the cable to be embedded in the earth over the entire circumference of the cable, in order to absorb any short-circuiting forces without the cable being damaged or shifted in position.

Laying cables in the ground also suffers from the disadvantage that a defective cable can only be replaced or exchanged after it has been completely dug up, and this gives rise to high costs and requires a considerable amount of time.

The known methods of laying cables also suffer from the disadvantage that the cables which are laid in a cable shaft or chute or in the ground cannot additionally be cooled with a cooling medium so that the power to be transmitted cannot be increased or, for a given power, the cable cross-section cannot be reduced and the cable therefore cannot be reduced in cost.

In addition, the prior art suffers from the disadvantage that, during the operation of pulling the cable into place, the cables are subjected to a high axial tensile loading as they are unrolled from a supply drum and are drawn into the desired position by being subjected to a high pulling force. This high pulling load on the cable results in many cases in damage to the sheathing of the cable and to the cable itself.

SUMMARY OF THE INVENTION

An object of the present invention is to avoid the disadvantages of the known art, and, in particular, to provide for laying and securing heavy electrical cables in a cable duct, by which heavy cables can be laid and possibly replaced or exchanged at favourable cost levels, without subjecting the cable to any axial tensile or compression loading during the laying operation and wherein moreover the cable can compensate for changes in length caused by changes in temperature, without axial tensile or compression stresses acting on the cable.

Another object of the present invention is to provide apparatus of the above-indicated kind, which permit cooling of the laid and secured cable.

Another object of the present invention is to permit heavy cables to be laid in cable ducts which extend in any curved configuration, without either the cable or the cable duct suffering from damage both during the operation of pulling the cable into place and also after the cable has been secured.

From one aspect, the invention provides for laying and securing heavy electrical cables in a cable duct, wherein cable holders are secured to the cable at regular spacings, at least one draw wire is secured to the assembly of cable holders and cable, the cable and the cable holders are then pulled into the cable duct by applying a pulling force to the draw wire, and after the cable has been pulled into the duct, the draw wire is anchored at both ends under a tensile stress.

This method provides for pulling heavy electrical cables into cable ducts with numerous curves, inexpensively, and if necessary replacing or exchanging such cables in such ducts, and firmly fixing the cables to resist axial and radial forces, without axial tensile stresses acting on the cable.

The invention also makes it possible, in a very simple manner, for cables which have already been laid and secured to be cooled by means of a cooling medium flowing in the cable duct.

Another object of the invention is to provide apparatus for carrying out this method.

From another aspect, apparatus for laying and securing heavy electrical cables in a cable duct according to the invention comprises at least one cable holder of cross-section corresponding approximately to the cross-section of said cable duct, means for lockingly securing said holder to said cable, at least one draw wire for pulling in and securing the cable and means for lockingly securing said draw wire to said assembly of cable holder and cable.

Apparatus according to the invention makes it possible on the one hand for the cable to be easily pulled into the duct and to be firmly fixed in place, both in the axial and in the radial direction. On the other hand, apparatus according to the invention also provides that, during the operation of pulling the cable into the duct and also in the final position thereof, neither the cable nor the inside walls of the cable duct are damaged as both the cable and the draw wire are kept spaced from the inside wall of the cable duct.

According to another feature of the invention, the cable is secured to the draw wire in a curved configuration. By virtue of this arrangement, changes in length of the cable caused by temperature can be absorbed, without axial tensile or compression stresses acting on the cable.

In one embodiment of the invention, a number of cable holders which are arranged at regular spacings from each other are secured to the draw wire, and the longitudinal centre line of the cable and that of the cable holders are arranged approximately concentrically.

The cable holders preferably have means for securing them to the cable and at least one securing clamp for securing the draw wire, so that the cable and the cable holders can be particularly reliably fixed to the draw wire.

In this arrangement, the cable holders advantageously comprise at least two parts which are form-lockingly and/or force-lockingly connected together, the cable being held in part-circular recesses in these cable holder parts.

So that the cable holders are secured radially in a better and more stable manner, both during the operation of pulling the cable in and also in the end position thereof, two draw wires may be secured to the cable holder at a spacing from each other and at the same spacing from the longitudinal centre line of the cable. In this arrangement, wire clip means may be provided between successive cable holders to hold the draw wires together. The draw wires may be held at a greater distance from the inside wall of the cable duct and the cable and the cable holders can be pulled in a cable duct which extends around a small radius.

The cable holders preferably comprise means for securing the cable, and a casing may be connected through at least two radially disposed arms to said means for securing the cable.

The cable holder may advantageously extend over the entire length of the cable and be substantially cylindrical, a draw wire and at least one cable which is secured in a curved configuration to the draw wire being arranged in the cable holder. When using the apparatus according to the invention for laying high-tension cables, three cables together with the draw wire, in an insulating elastic material may be provided in the cable holder. In this arrangement, the cables may extend in a helical configuration around the draw wire.

The surface of the cable holder may advantageously have cooling ribs, to achieve optimum cooling of the cable by means of a cooling medium which flows in the cable duct.

For the purposes of reducing the pulling forces which are applied to the cable in the operation of pulling the cable into position, the cable holders may have at least three rollers which are uniformly distributed around the periphery thereof and which project beyond the surface thereof. Likewise, the cable holders may be coated with a material with a low coefficient of friction or may comprise such a material.

A further reduction in the pulling forces required when pulling the cable into place can be achieved if the operation of pulling the cable into place is effected with a slide means which is disposed in the cable duct and which at the same time results in a reduction in the weight of the cable.

BRIEF DESCRIPTION OF THE DRAWINGS

Other parts of the invention are embodied in the various embodiments thereof which will now be described by way of example, with reference to the accompanying drawings, in which:

FIG. 6 is a plan view of part of the embodiment shown in FIG. 5;

FIG. 7 is a view in cross-section of a further embodiment;

FIG. 8 is a plan view of part of a further embodiment;

FIG. 9 is a view in cross-section taken along line IX—IX in FIG. 8; and

FIG. 10 is a view in cross-section taken along line X—X in FIG. 6.

DESCRIPTION OF PREFERRED EMBODIMENTS

Figure 1:
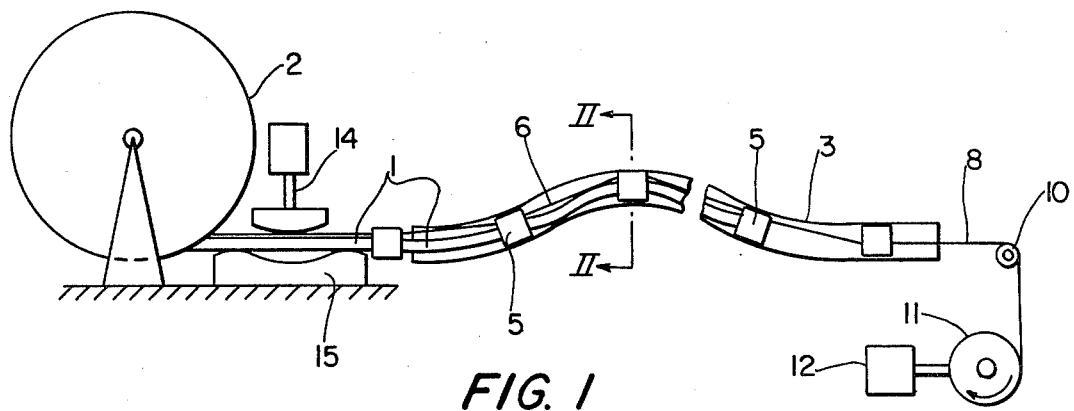
FIG. 1 is a diagrammatic view of a cable line during the operation of pulling the cable into place.

FIG. 1 is a diagrammatic, partly sectional view of a cable line, wherein the cable 1 has been partly pulled into a cable duct 3. A plurality of cable holders 5, arranged at a spacing from each other, are secured to the cable 1 in order to hold the cable 1 spaced from the inside walls of the cable duct 3 and thereby to prevent the cable from coming into contact with the inside walls of the cable duct. A draw wire 6 is secured to the cable holders 5 in such a way that, when the cable 1 is pulled into the cable duct 3, the axial pulling forces are transmitted exclusively by way of the draw wire 6 and not by way of the cable.

As can be seen from FIG. 1, the outside dimensions of the cable holders 5 are less than the inside dimensions of the cable duct 3 so that the cable holders can slide easily within the cable duct 3.

The cable 1 with the draw wire 6 and the cable holders 5 secured to the cable is drawn into the cable duct by means of a pulling wire 8, which can also be spaced at a distance from the inside wall of the cable duct by cable holders 5. After leaving the cable duct 3, the pulling wire 8 is passed over a support roll 10 to a wire drum 11 which is driven in the direction indicated by the arrow by a motor 12.

The cable 1 to be pulled into the duct 3 is unwound from a supply drum 2 and is provided with the cable holders 5 before it passes into the cable duct. At the same time, in the region between two successive cable holders, a sag or downwardly curved portion is formed in the cable 1 by means of a hydraulic press 14 which presses against a support member 15. The sag portion in the cable 1 causes temperature-dependent changes in the length of the cable to take effect as changes in the amount of sag and therefore such temperature-dependent length changes do not act on the cable in the form of axial tensile or compression forces.

Figure 2:
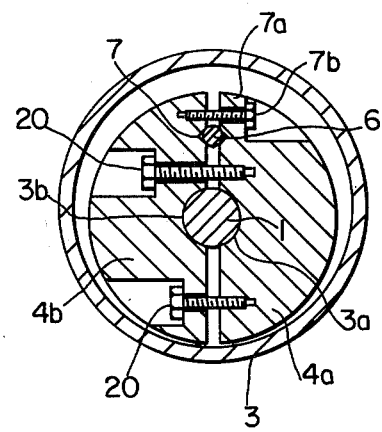
FIG. 2 is a view in section taken along line II—II in FIG. 1.

FIG. 2 is a cross-section of the cable holder shown in FIG. 1 in which both the cable duct 3 and also the cable holder 5 itself are of circular cross-section. As can be seen from FIG. 2, the cable holder 5 comprises two semicircular parts 4a and 4b which are secured together by means of screws 20. In this arrangement, the cable 1 is firmly held in recesses 3a and 3b in the semicircular parts of the cable holder.

Provided between the two semicircular parts 4a and 4b is a further recess 7 in which the draw wire 6 is arranged and is clamped by means of a resilient projection 7a and a screw 7b.

For reasons of production, the cable holder 5 is made from plastics material with a low coefficient of friction (for example polyamide).

The cable duct 3 is for example of polyethylene.

Figure 3:
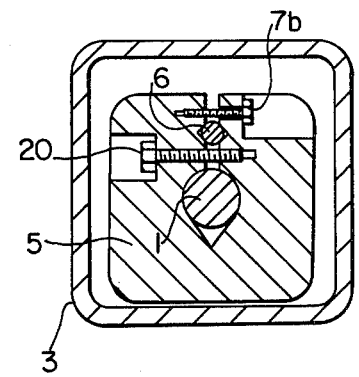
FIG. 3 is a view in cross-section of a further embodiment, similar to the view shown in FIG. 2.

FIG. 3 is a cross-section of a further embodiment of the apparatus according to the invention, in which both the cable duct 3 and the cable holder 5 are of approximately square or rectangular cross-section. This insures that the cable holder cannot turn during the operation of pulling the cable into the duct, and thus provides for better fixing of the cable 1.

The cable holder in this embodiment is of a one-piece construction and has just one screw 20 for securing the cable. For the purposes of laying the cable 1 into the cable holder, the cable holder is temporarily pressed apart in the region of the recesses for the draw wire 6 and the cable 1. The draw wire 6 is then fitted into place and clamped firmly by means of the screw 7b.

Figure 4:
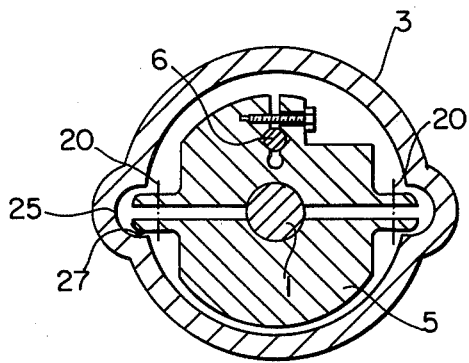
FIG. 4 is a view in cross-section of a further embodiment.

The embodiment shown in FIG. 4 comprises a cable duct 3 and a cable holder 5 of substantially circular cross-section, in which the cable holder 5 is prevented from rotating in the cable duct by means of two elongate guide grooves 25 which are provided in the cable duct and two projections 27 which are provided on the cable holder. It will be clear that alternatively projections may be provided on the cable duct and complementary recesses on the cable holders.

Figure 5:
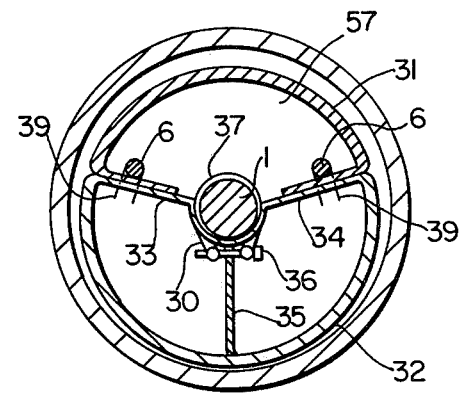
FIG. 5 is a view in cross-section of a further embodiment.

FIG. 5 shows a further embodiment of the invention. In this embodiment, the cable holder 5 comprises a cable shell portion 30 in which the cable 1 lies and is secured by means of a clamp strap 37 and a clamping screw 36, and a first casing portion 31, a second casing portion 32 and three radially disposed arms 33, 34 and 35 which interconnect the cable shell portion and the casing portions. A free space is formed between the arms, in which a cooling medium 57 can flow almost without hindrance.

A draw wire 6 is secured to each of the upper arms 33 and 34 by means of a U-shaped securing clamp 39. The securing clamps 39 also serve to connect the cable shell 30, the first casing portion 31, the second casing portion 32 and the arms 33 and 34. The arm 35 is welded both to the cable shell portion 30 and also to the second casing portion 32.

In order to achieve a higher degree of stability both when pulling the cable into place and also in the final position thereof, the two draw wires 6 are connected together by means of a wire clip means 40 in the region between two successive cable holders 5, as can be seen in particular from FIG. 6.

After the cable 1 has been pulled into place, the cable is secured so as to be stationary in the axial and radial directions, by anchoring the draw wires 6 at each end of the cable duct 3. The cable may thus be reliably held without damage, even when high short-circuiting forces occur.

FIG. 7 shows a further embodiment in which a further reduction in friction between the cable holder 5 and the cable duct 3 is achieved. For this purpose, three rollers 45 which are uniformly spaced around the periphery of the cable holder 5 are arranged at each of the two ends of the cable holder 5. The rollers 45 are carried in U-shaped mountings 46 which are secured to the arms 33, 34 and 35. As can be seen from FIG. 7, the rollers 45 project beyond the surface of the cable holder 5 and therefore enable the cable holder to move along the cable duct on the rollers 45.

FIG. 8 shows a further embodiment of the apparatus according to the invention, in which the cable holder 50 is formed uninterruptedly as a tube within which three cables 52, 53 and 54 are arranged in a helical configuration about the draw wire 6. For permanently securing the cables 52, 53 and 54 relative to each other and for securing the cables to the cable holder 50 and to the draw wire 6, the cable holder is filled with an elastic insulating material, as can be particularly clearly seen from FIG. 9. In order to provide improved cooling of the cables, the cable holder has cooling ribs 58 in order to transmit the heat produced to a cooling medium 57 which flows in the cable duct.

FIG. 10 shows a section through the anchoring of the draw wires 6. The draw wires 6 which project out of the ends of the cable duct 3 are passed over an anchor plate 63 which is secured to the ground or to a concrete plate 60 by means of screws 62, and respectively secured to the anchor plate 63 by means of two U-shaped cable clips 65 and 66, under tensile stress.

We claim:

1. Apparatus for laying and securing heavy electric cable in a cable duct, comprising at least one cable holder fastened with positive force engagement to the cable, said cable holder being connected with at least one draw and tensioning wire for pulling into and securing the cable in the cable duct, the cross section of the cable holder corresponding approximately to the cross section of the cable duct, said cable holder comprising fastening means for fastening the cable, a casing that surrounds the said cable and fastening means, and at least two radially disposed cross pieces that extend between and are connected with said fastening means and said casing, and wherein said at least one draw and tensioning wire is fixed to one of said cross pieces.

2. Apparatus as in claim 1, characterized in that the cable duct and the cable holder present generally circular cross sections.

3. Apparatus as in claim 1, characterized in that the cable holder presents three crosspieces disposed at about an angle of 120°.

4. Apparatus as in claim 1, characterized in that the casing that surrounds the cable is bipartite, and in that the point of connection of the two casing parts is located adjacent the radially disposed crosspieces.

5. Apparatus as in claim 1, characterized in that the casing is provided at the outside with roller bodies distributed on the periphery of the casing.

6. Apparatus as in claim 1, characterized in that at least two cable holders and at least two tensioning wires are provided, and that a cable clamp is provided for holding the tensioning wires together between each two successive cable holders.

* * * * *